(12) United States Patent
Ye et al.

(10) Patent No.: US 9,728,988 B2
(45) Date of Patent: Aug. 8, 2017

(54) CHARGING CIRCUIT FOR USB PORT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Xin Ye, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 213 days.

(21) Appl. No.: 14/695,766

(22) Filed: Apr. 24, 2015

(65) Prior Publication Data
US 2016/0226282 A1  Aug. 4, 2016

(30) Foreign Application Priority Data

Feb. 3, 2015  (CN) .......................... 2015 1 0055170

(51) Int. Cl.
*H01M 10/46* (2006.01)
*H02J 7/00* (2006.01)
*G06F 1/26* (2006.01)
*H02M 3/155* (2006.01)

(52) U.S. Cl.
CPC ............ *H02J 7/0052* (2013.01); *G06F 1/266* (2013.01); *H02J 2007/0062* (2013.01); *H02M 3/155* (2013.01)

(58) Field of Classification Search
CPC ....... H02J 2007/0062; H02J 2007/0059; H02J 7/007
USPC .................. 320/103, 107, 111, 114, 139, 140
See application file for complete search history.

(56) References Cited

U.S. PATENT DOCUMENTS

| | | | | |
|---|---|---|---|---|
| 8,225,114 | B2* | 7/2012 | Li | H02J 7/0052 320/107 |
| 8,482,256 | B2* | 7/2013 | Zhu | H02J 7/0042 320/103 |
| 9,041,338 | B2* | 5/2015 | Shen | H02J 7/0052 320/101 |
| 2011/0316472 | A1* | 12/2011 | Han | G06F 13/4068 320/103 |
| 2014/0285137 | A1* | 9/2014 | Shapley | H02J 7/0045 320/107 |
| 2014/0365695 | A1* | 12/2014 | Peng | G06F 13/385 710/110 |

* cited by examiner

*Primary Examiner* — Edward Tso
(74) *Attorney, Agent, or Firm* — Steven Reiss

(57) ABSTRACT

A charging circuit for a USB port includes a first connector, a second connector, and a voltage booster circuit. The first connector includes a first power pin. The second connector includes a second power pin. The voltage booster circuit is connected between the first connector and the second connector. The voltage booster boosts a voltage provided by the first power pin of the first connector and provides the boosted voltage to the second power pin of the second connector to charge an electronic device.

15 Claims, 3 Drawing Sheets ated. The second port 30 is used to connect a portable electronic device to charge the portable electronic device.

Figure 1:
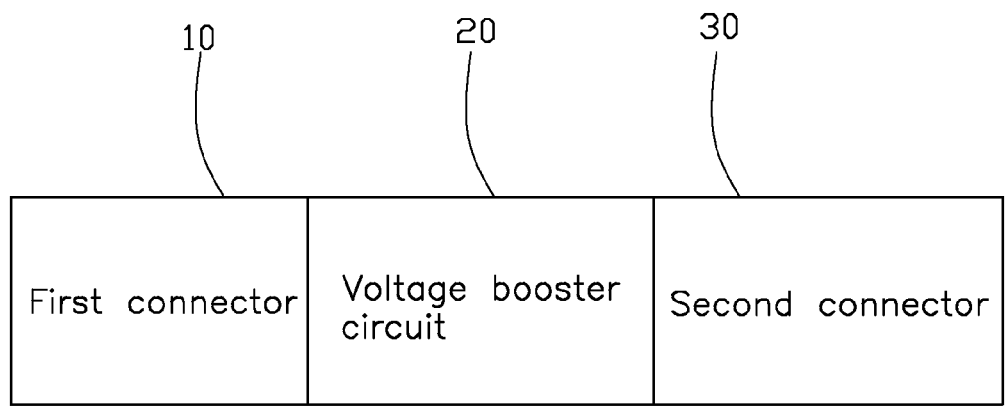
Figure 2:
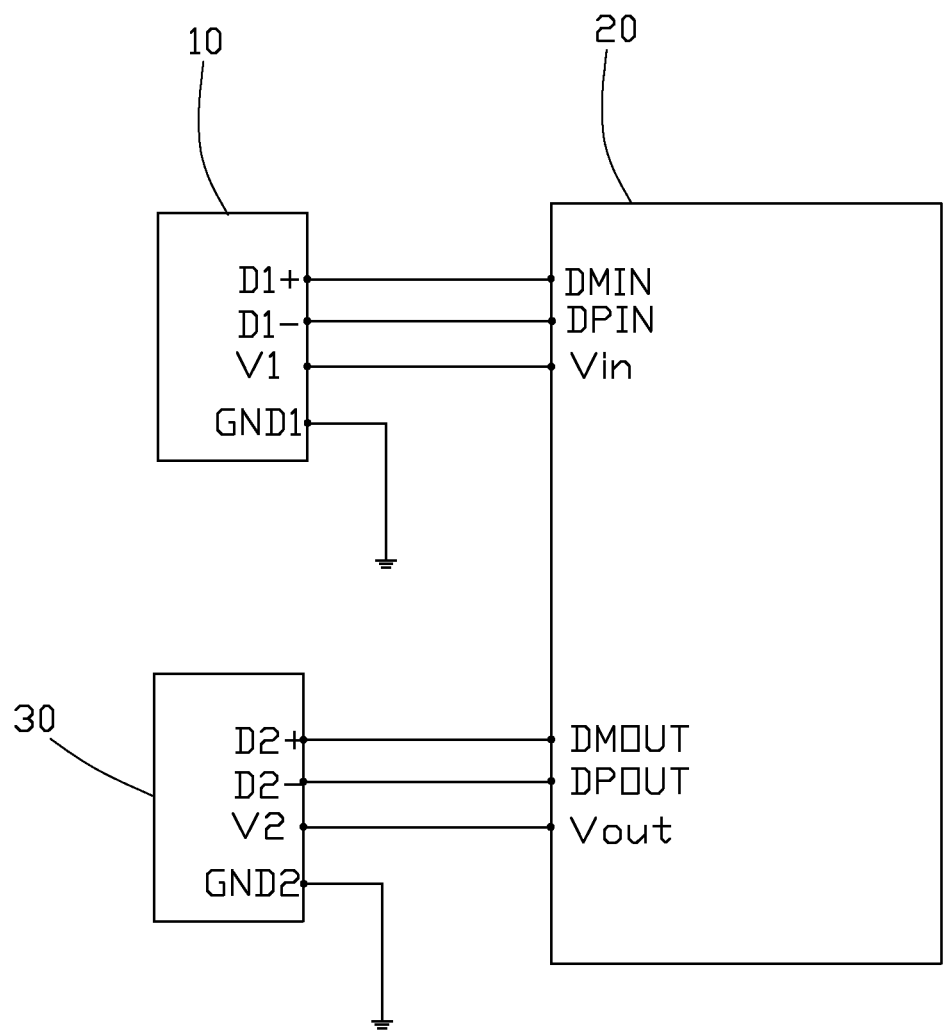

Referring to FIG. 2, the first connector 10 includes a first power pin V1, a first positive data pin D1+, a first negative data pin D1−, and a first ground pin GND1. The first power pin V1 receives a first voltage supplied from the USB port of the computer. The first positive data pin D1+ and the first negative data pin D1− are used transfer data.

The second connector 30 includes a second power pin V2, a second positive data pin D2+, a second negative data pin D2−, and a second ground pin GND2. The second power pin V2 is used to charge the portable electronic device. The second positive data pin D2+ and the second negative data pin D2− are used transfer data.

The voltage booster circuit 20 includes two data input pins DMIN and DPIN, two data output pins DMOUT and DPOUT, a power input pin Vin, and a power output pin Vout.

The first positive data pin D1+ is connected to the data input pin DMIN, and the first negative data pin D1− is connected to the data input pin DPIN. The first ground pin GND1 is connected to ground. The first power pin V1 is connected to the power input pin Vin of the voltage booster circuit 20. The second positive pin D2+ is connected to the data output pins DMOUT, and the second negative pin D2− is connected to the data output pins DPOUT. The second ground pin GND2 is connected to ground. The second power pin V2 of the second connector 30 is connected to the power output pin Vout of the voltage booster circuit 20.

Figure 3:
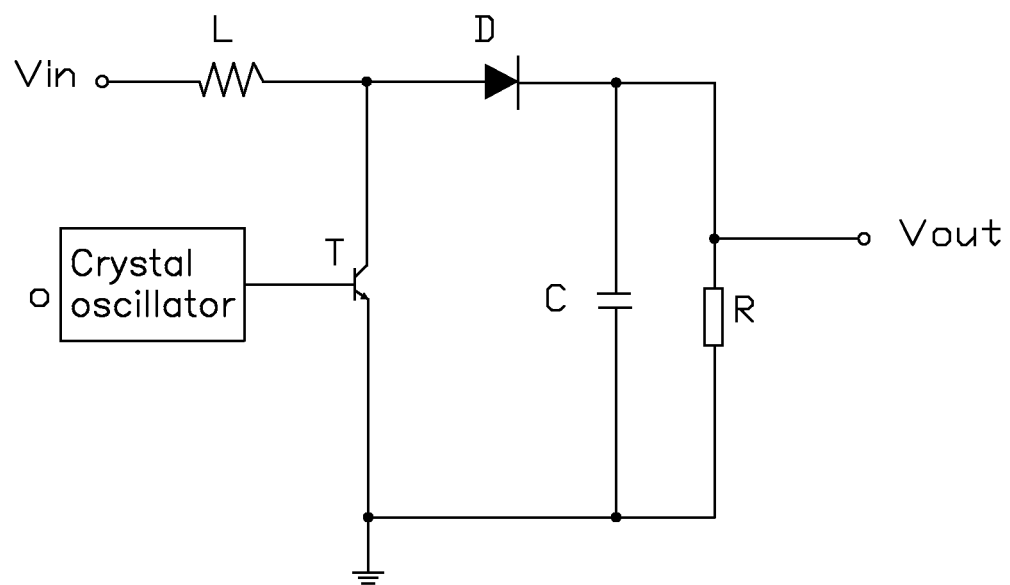

Referring to FIG. 3, the voltage booster circuit 20 includes an inductor L, a transistor T, a diode D, a capacitor C, a resistor R, and a crystal oscillator O. A first end of the inductor L is connected to the power input pin Vin, and a second end of the inductor L is connected to a collector of the transistor T. An emitter of the transistor T is connected to ground. A base of the transistor T is connected to the crystal oscillator O. The crystal oscillator O outputs a periodic pulse signal to the base of the transistor T to turn on and off the transistor T periodically. The second end of the inductor L is connected to a positive end of the diode D. The capacitor C and the resistor R are respectively connected between a negative end of the diode D and ground. The power output pin Vout is connected to the negative end of the diode D. Therefore, an output voltage on the power output pin Vout is equal to an input voltage on the power input pin Vin division by a duty cycle of the pulse signal to booster the output voltage of the power output pin Vout.

The output voltage of the power output pin Vout is transmitted to the second power pin V2 of the second connector 30. Therefore, the portable electronic device can be quickly charged by the second connector 30.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to, and including, the full extent established by the broad general meaning of the terms used in the claims. It will therefore be appreciated that the embodiments described above may be modified within the scope of the claims.

What is claimed is:

1. A charging circuit for a USB port, the charging unit comprising:

a first connector comprising a first power pin;

a second connector comprising a second power pin; and
a voltage booster circuit connecting to the first connector and the second connector,
wherein the voltage booster circuit is configured to boost a voltage provided by the first power pin and provide the boosted voltage to the second power pin;
wherein the voltage booster circuit comprises an inductor and a diode, a first end of the inductor is connected to the first power pin, a second end of the inductor is connected to a positive end of the diode, and the second power pin is connected to a negative end of the diode.

2. The charging circuit of claim 1, wherein the voltage booster circuit further comprises, a transistor, a capacitor, and a resistor, the second end of the inductor is connected to a collector of the transistor, an emitter of the transistor is connected to ground, a base of the transistor receives a periodic pulse signal to turn on and off the transistor periodically, and the capacitor and the resistor are respectively connected between the negative end of the diode and ground.

3. The charging circuit of claim 2, wherein the voltage booster circuit further comprises a crystal oscillator which generates a periodic pulse signal provided to the base of the transistor.

4. The charging circuit of claim 3, wherein an output voltage on the second power pin is equal to an input voltage on the first power pin division by a duty cycle of the periodic pulse signal.

5. The charging circuit of claim 1, wherein the first connector is a plug USB port, the second connector is a socket USB port, the first connector is plugged in a USB port of a computer, and the second port is connected to a portable electronic device to charge the portable electronic device.

6. The charging circuit of claim 1, wherein the first connector comprises a first positive data pin and a first negative data pin, the voltage booster circuit further comprises two data input pins connected to the first positive data pin and the first negative data pin.

7. The charging circuit of claim 1, wherein the second connector comprises a second positive data pin and a second negative data pin, the voltage booster circuit comprises two data output pins connected to the second positive data pin and the second negative data pin.

8. The charging circuit of claim 1, wherein each of the first connector and the second connector comprises a ground pin connected to ground.

9. A charging circuit for a USB port, the charging circuit comprising:

a first connector configured to connect to the USB port;
a second connector configured to charge a portable electronic device; and
a voltage booster circuit connecting to the first connector and the second connector, the voltage booster comprising a transistor, a collector of the transistor connected to the first connector to receive an input voltage, the collector of the transistor connected to the second connector via a diode to output an output voltage;
wherein the output voltage is equal to the input voltage division by a duty cycle of a periodic pulse signal.

10. The charging circuit of claim 9, wherein the first connector comprises a first power pin, the second connector comprises a second power pin, the voltage booster circuit comprises an inductor, a capacitor, and a resistor, a first end of the inductor is connected to the first power pin, a second end of the inductor is connected to the collector of the transistor, an emitter of the transistor is connected to ground, the second end of the inductor is connected to a positive end of the diode, the capacitor and the resistor are respectively connected between a negative end of the diode and ground, and the second power pin is connected to the negative end of the diode.

11. The charging circuit of claim 10, wherein the voltage booster circuit further comprises a crystal oscillator which generates the periodic pulse signal provided to the base of the transistor.

12. The charging circuit of claim 9, wherein the first connector is a plug USB port, the second connector is a socket USB port, the first connector is plugged in the USB port, and the second port is connected to the portable electronic device to charge the portable electronic device.

13. The charging circuit of claim 9, wherein the first connector comprises a first positive data pin and a first negative data pin, the voltage booster circuit further comprises two data input pins connected to the first positive data pin and the first negative data pin.

14. The charging circuit of claim 9, wherein the second connector comprises a second positive data pin and a second negative data pin, the voltage booster circuit currently amended comprises two data output pins connected to the second positive data pin and the second negative data pin.

15. The charging circuit of claim 9, wherein each of the first connector and the second connector comprises a ground pin connected to ground.

* * * * *